(12) United States Patent
Enders et al.

(10) Patent No.: US 7,474,015 B2
(45) Date of Patent: Jan. 6, 2009

(54) METHOD AND SUPPLY LINE STRUCTURE FOR TRANSMITTING DATA BETWEEN ELECTRICAL AUTOMOTIVE COMPONENTS

(75) Inventors: Thorsten Enders, Illingen (DE); Robert Hugel, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/488,373

(22) PCT Filed: Jul. 20, 2002

(86) PCT No.: PCT/DE02/02681

§ 371 (c)(1),
(2), (4) Date: Sep. 1, 2004

(87) PCT Pub. No.: WO03/028305

PCT Pub. Date: Apr. 3, 2003

(65) Prior Publication Data

US 2005/0040709 A1 Feb. 24, 2005

(30) Foreign Application Priority Data

Aug. 31, 2001 (DE) ................................. 101 42 408

(51) Int. Cl.
*B60L 1/00* (2006.01)
(52) U.S. Cl. ................................. 307/10.1; 307/DIG. 1
(58) Field of Classification Search .................. 307/9.1, 307/10.1
See application file for complete search history.

(56) References Cited

U.S. PATENT DOCUMENTS

| 5,539,388 | A |   | 7/1996 | Modgil |  |
|---|---|---|---|---|---|
| 5,640,055 | A |   | 6/1997 | Sugiyama et al. |  |
| 5,784,547 | A | * | 7/1998 | Dittmar et al. | 714/4 |
| 6,122,273 | A | * | 9/2000 | Cantwell et al. | 370/359 |
| 6,373,375 | B1 | * | 4/2002 | Hoetzel et al. | 340/425.5 |
| 6,404,326 | B1 | * | 6/2002 | Timmerman et al. | 340/286.01 |
| 6,512,307 | B1 | * | 1/2003 | Ilg | 307/9.1 |
| 6,563,419 | B1 |   | 5/2003 | Herz et al. |  |
| 6,577,230 | B1 |   | 6/2003 | Wendt |  |
| 2001/0047491 | A1 | * | 11/2001 | Indefrey et al. | 713/320 |
| 2002/0167398 | A1 | * | 11/2002 | Strasser | 340/425.5 |
| 2003/0076221 | A1 | * | 4/2003 | Akiyama et al. | 340/310.01 |

FOREIGN PATENT DOCUMENTS

| DE | 195 48 968 | 7/1996 |
|---|---|---|
| DE | 197 03 144 | 7/1998 |
| DE | 198 37 242 | 3/2000 |
| DE | 199 00 869 | 7/2000 |
| DE | 199 06 095 | 8/2000 |
| DE | 199 13 919 | 10/2000 |
| DE | 199 60 471 | 3/2001 |

(Continued)

*Primary Examiner*—Stephen W Jackson
*Assistant Examiner*—Daniel Cavallari
(74) *Attorney, Agent, or Firm*—Kenyon & Kenyon LLP

(57) ABSTRACT

A method and a supply line structure for transmitting information between electrical components in a motor vehicle is described. The information is transmitted over a data bus. At least some of the components are powered via a supply line structure. To make the transmission of information between the components fail-safe, the information is also transmitted over the supply line structure in addition to over the data bus at least after a failure of the data bus.

1 Claim, 4 Drawing Sheets

FOREIGN PATENT DOCUMENTS

| | | |
|---|---|---|
| EP | 1 085 674 | 3/2001 |
| JP | 63-035020 | 2/1988 |
| JP | 02-149147 | 6/1990 |
| JP | 07-253938 | 10/1995 |
| JP | 08-023338 | 1/1996 |
| JP | 2004350137 A * | 12/2004 |
| WO | WO 92/21180 | 11/1992 |
| WO | WO 9935543 A1 * | 7/1999 |
| WO | WO 00/04427 | 1/2000 |

* cited by examiner

METHOD AND SUPPLY LINE STRUCTURE FOR TRANSMITTING DATA BETWEEN ELECTRICAL AUTOMOTIVE COMPONENTS

FIELD OF THE INVENTION

The present invention relates to a method for transmitting information between electrical components in a motor vehicle. The information may be transmitted over a data bus. At least some of the components may be powered via a supply line structure.

Furthermore, the present invention relates to a bus system for transmitting information between electrical components in a motor vehicle. The bus system may include a data bus. At least some of the components may be connected to the supply line structure provided in the motor vehicle for powering the components.

The present invention furthermore may include an electrical component of a motor vehicle which has an arrangement for transmitting information to other electrical components via a data bus and for receiving information from other electrical components via a data bus. The component and at least some of the other components may be connected to a supply line structure for power supply.

BACKGROUND INFORMATION

Communication between different electrical components in a motor vehicle, such as, for example, a door control unit and a seat control unit, may occur via a bus system (e.g., Controller Area Network—CAN). In addition, new bus configurations may be currently being developed in which communication between the electrical components occurs via a supply line structure to power the electrical components of the vehicle. This bus concept may also be known as powerline communications. Presently powerline communications may only be operated with limitations in supply line structures provided in motor vehicles, because the information to be transmitted via the supply line structure may arrive at the receiving component significantly attenuated due to interference and reflection or may not even be distinguishable from interference or noise signals.

International Published Patent Application No. WO 92/21180 describes a supply line structure for powerline communications. In this document, the mode of operation of powerline communications and approaches for addressing different problems that may occur in the implementation of powerline communications are discussed. Reference is expressly made to this document regarding the configuration of a supply line structure for powerline communications and regarding the mode of operation of powerline communications.

Furthermore, German Published Patent Application No. 197 03 144 describes a method for transmitting information in a motor vehicle via a supply line structure. The powerline communications described therein may be limited to the use for electrical components of a backing-up aid in a motor vehicle. A supply line structure already present in the motor vehicle may be used for powerline communications without specific modifications or adjustments of the powerline communications.

Data buses may operate in a more or less fault-tolerant manner. However, components relevant to safety, such as X-by-wire applications, for example, in which fail-safe data transmission via data buses may be required to be ensured, may be increasingly used in motor vehicles. In order to achieve the required fail-safe operation at least approximately, the data buses may be configured to be redundant at least in some areas.

The redundant configuration of the bus systems using a plurality of data buses, however, may result in increased material costs for the additional data bus and in increased labor and cost for routing the additional data bus in the motor vehicle.

SUMMARY

The present invention may enhance the fail-safe feature of a bus system, such as, for example, for use in areas relevant to the safety of the motor vehicle, with reduced cost and labor.

The present invention, based on an exemplary method for transmitting information between motor vehicle components of the aforementioned type, may provide that the information also be transmitted via the supply line structure in addition to over the data bus at least after a failure of the data bus.

The present invention may be based on the feature that each electrical component in a motor vehicle, such as, for example, in systems relevant to safety, may be required to be supplied with electric power and the supply lines are available. Motor vehicle control units, for example, but also hydraulic or pneumatic or other types of electrically triggerable components, may be understood as electrical components as defined in the present invention. However, the components of areas relevant to safety in the motor vehicle such as engine controller, power train, or the brake system (in X-by-wire applications) may be understood as electrical components.

Transmission of information via the supply line structure may also be referred to as powerline communications. Due to the additional transmission of information via the supply line structure in addition to via the data bus, an at least partially redundant channel may be available in an existing bus system. Even if the entire communication network of the vehicle cannot be configured to be redundant via the supply line structure, an emergency function or a limp-home function may be performed in any case via this channel. In this manner, failure of an electrical component due to a fault in the information transmission to other components, or even to total failure of the entire motor vehicle, may be prevented. Susceptibility to failure of the bus system according to the present invention may be substantially less than that of the data bus alone.

The data bus may be configured as a standardized bus system intended for transmitting information. If information can no longer be transmitted over the data bus due to line defects or transceiver defects, for example, at least the relevant information may be transmissible over the supply line structure. An exemplary bus system according to the present invention may be used in areas relevant to safety, such as, for example MotorCAN, power train controller, brake system controllers, or other X-by-wire applications. The present invention may therefore use a supply network already present in the motor vehicle as a second physical layer for communication between the components in the motor vehicle, such as, for example, a redundant bus system using powerline communications.

Using an exemplary embodiment and/or exemplary method of the present invention, the communication link between systems relevant to safety may be ensured and the fail-safe feature of the system may be enhanced. No additional lines may be required to be installed to implement the redundant transmission link, whereby the additional complexity and additional costs of the second transmission link may be minimized. The supply line structure may be already relevant to safety, because communication may occur over supply lines which may not be permitted to fail because of the power supply in systems relevant to safety.

According to an exemplary embodiment of the present invention, the information may be transmitted with redundancy over the data bus and over the supply line structure. The same information may thus be present in the receiving components, the information being transmitted both over the data bus and over the supply line structure.

According to an exemplary embodiment of the present invention, the information transmitted over the supply line structure may not be analyzed in a receiving component if information transmission over the data bus is functioning properly. The information transmitted over the supply line structure may only be evaluated in the receiving component in the event of failure of the information transmission over the data bus.

As an exemplary alternative, the information transmitted over the supply line structure may be compared in a receiving component with the information transmitted over the data bus. The information additionally transmitted over the supply line structure may thus be used for a plausibility check. In this manner, transmission errors may be detected and suitable measures may be taken such as, for example, retransmitting the information or ignoring the transmitted (possibly erroneous) information.

According to another exemplary embodiment of the present invention, if the information transmission over the data bus is functioning properly, the information may be transmitted exclusively over the data bus and, in the event of faulty information transmission over the data bus, the information may be transmitted over the supply line structure. According to this exemplary embodiment, the supply line structure may only be used for transmitting information if the information transmission over the data bus does not function properly. When the information transmission is functioning properly, the supply line structure may then be used for transmitting other information.

If information transmission over the data bus is functioning properly, other information may be transmitted over the supply line structure. This communication on the supply line structure, which may be independent of the information transmission over the data bus, may be interrupted if needed in order to enable transmission of information over the supply line structure in the event of faulty information transmission over the data bus. As an alternative, communication may also continue over the supply line structure, a smaller bandwidth being then available for the information transmission via the supply line structure as a substitute for transmission via the data bus. This bandwidth may, however, be adequate for taking over a vital portion of the information transmission from the data bus, thus the possibility of an emergency operation may be ensured.

On the basis of the bus system for transmitting information between electrical motor vehicle components, an exemplary embodiment of the present invention may provide that, in addition to the data bus, the bus system may include the supply line structure for transmitting information at least after a failure of the data bus.

According to an exemplary embodiment of the present invention, the data bus may be configured as a controller area network (CAN) bus.

According to an exemplary embodiment of the present invention, the bus system may include an arrangement for performing an exemplary method according to the present invention.

According to an exemplary embodiment of the present invention, on the basis of the electrical motor vehicle component of the above-mentioned type, the component may have a further arrangement for transmitting information to other electrical components over the supply line structure and for receiving information from other electrical components over the supply line structure at least after a failure of the data bus.

According to an exemplary embodiment of the present invention, the component may have an arrangement for performing an exemplary method according to the present invention.

DETAILED DESCRIPTION

Figure 1:
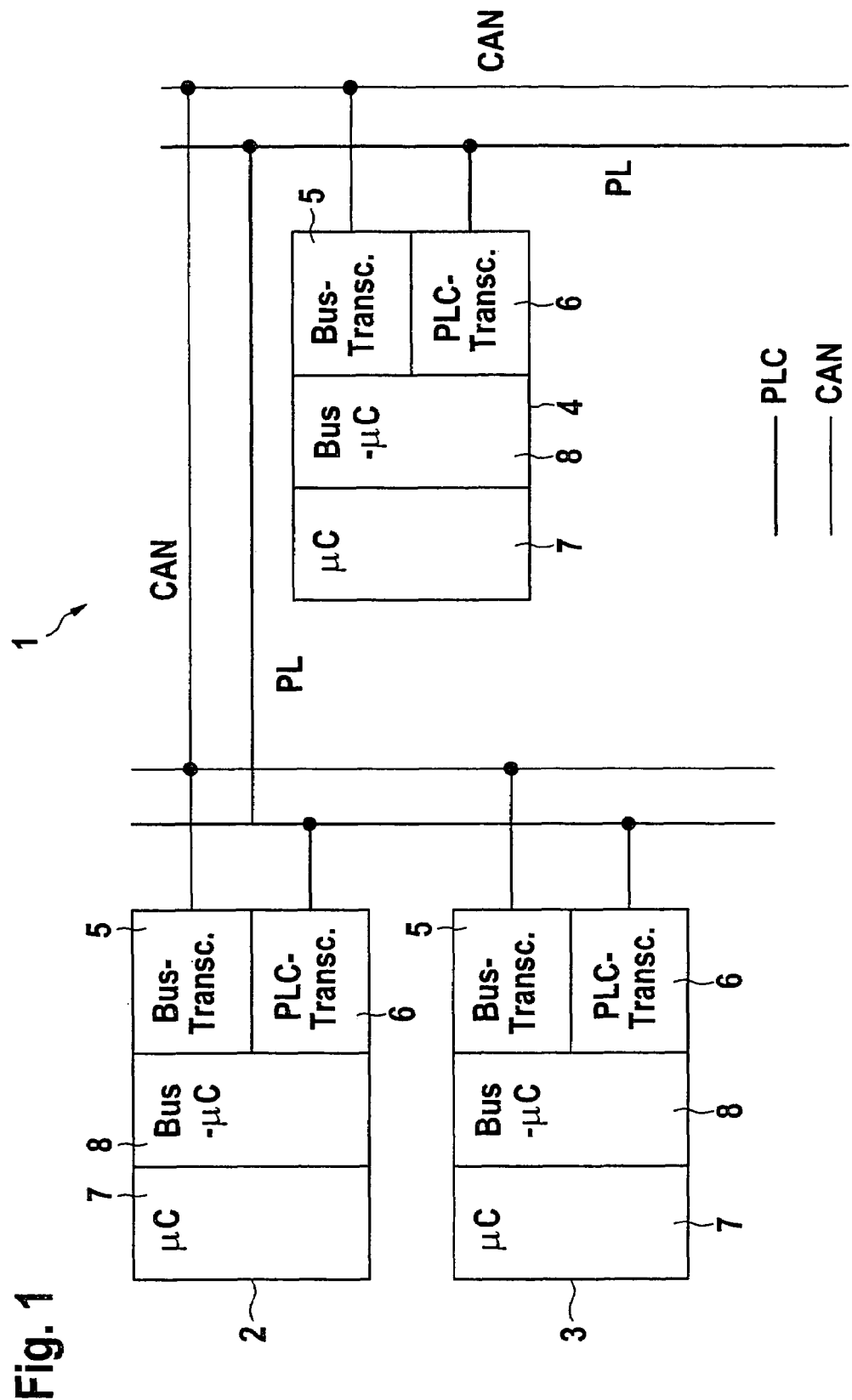
FIG. 1 shows an exemplary embodiment of a bus system according to the present invention.

FIG. 1 shows a bus system according to an exemplary embodiment of the present invention identified in its entirety with the symbol 1. Bus system 1 is used for transmitting information between electrical components 2, 3, 4 in a motor vehicle. Electrical components 2, 3, 4 may be control units, for example, for different motor vehicle functions, including, for example, control units in areas relevant to the safety of the motor vehicle, such as, for example, an internal combustion engine, a power train, a brake system, or any other X-by-wire application. However, hydraulic or pneumatic or other types of electrically triggerable components may also be defined as electrical components 2, 3, 4 in the sense of the present invention.

Bus system 1 includes a standardized data bus, which is intended for the transmission of information. The data bus in the present exemplary embodiment is configured as a controller area network (CAN) bus and depicted in FIG. 1 by a thin line. Electrical components 2, 3, 4 are powered via a supply line structure PL. Supply lines PL are depicted in FIG. 1 using a thick line. According to an exemplary embodiment of the present invention, supply line structure PL is part of bus system 1 as a redundant communication network. The information may not therefore be transmitted only over data bus CAN but, if needed, also over supply line structure PL. Transmission of information over supply lines PL may be referred to as powerline communications (PLC).

Motor vehicle components 2, 3, 4 include a bus transceiver 5 for transmitting information to other electrical components 2, 3, 4 via data bus CAN and for receiving information from other electrical components 2, 3, 4 via data bus CAN. Furthermore, each of components 2, 3, 4 has a PLC transceiver 6 for transmitting information to other electrical components 2, 3, 4 via supply line structure PL and for receiving information from other electrical components 2, 3, 4 via supply line structure PL. Components 2, 3, 4 also include a computing unit 7, such as, for example, a microprocessor, capable of running a control program for performing the control or regulating function of components 2, 3, 4.

Finally, components 2, 3, 4 include another computing unit 8 for controlling the information transmission via transceivers 5 and 6. Additional computing unit 8 may be used to alleviate the load on computing unit 7.

Figure 2:
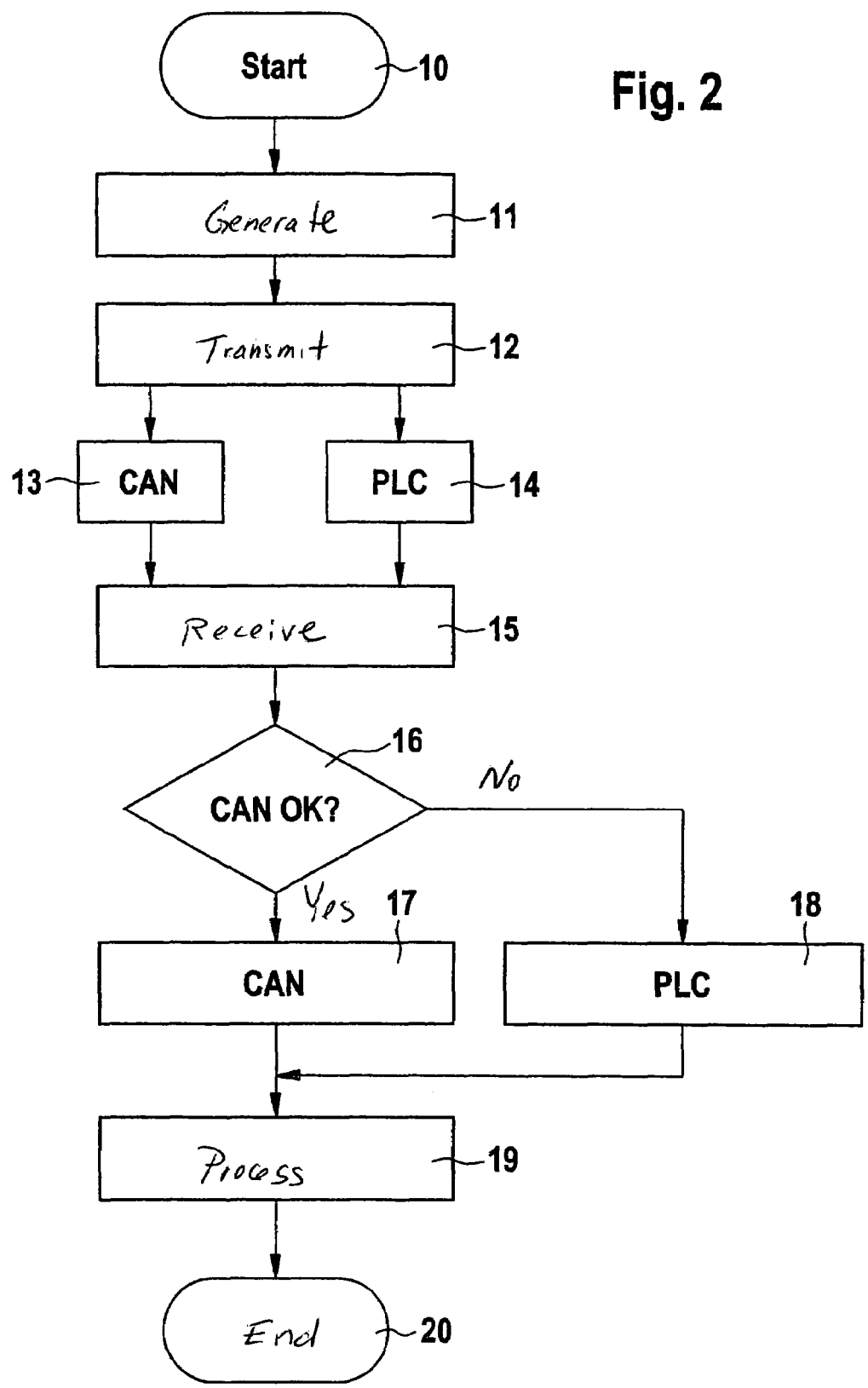
FIG. 2 shows a sequence chart of a first exemplary embodiment of a method according to the present invention.

FIG. 2 shows a first exemplary embodiment of an exemplary method according to the present invention. The exemplary method starts in a function block 10. Information that is to be transmitted via bus system 1 is generated in a function block 11. In a function block 12, the generated information is transmitted via bus system 1, for example, via both data bus CAN (function block 13) and supply line structure PL (function block 14). Function blocks 11 and 12 are configured to be contained in one component 2, 3, 4, which intends to transmit information.

The information transmitted via data bus CAN and supply line structure PL is received in a function block 15. Subsequently, in a query block 16 it is checked whether data bus CAN is functioning properly. If so, the information received over data bus CAN is used for further processing (function block 17). Otherwise the information transmitted over supply line structure PL is used for further processing (function block 18). In a function block 19 the information transmitted over data bus CAN or supply line structure PL is then processed. The exemplary method steps represented by function blocks 15 through 19 may be executed in one component 2, 3, 4, which receives information. The exemplary method according to the present invention is terminated in a function block 20.

Figure 3:
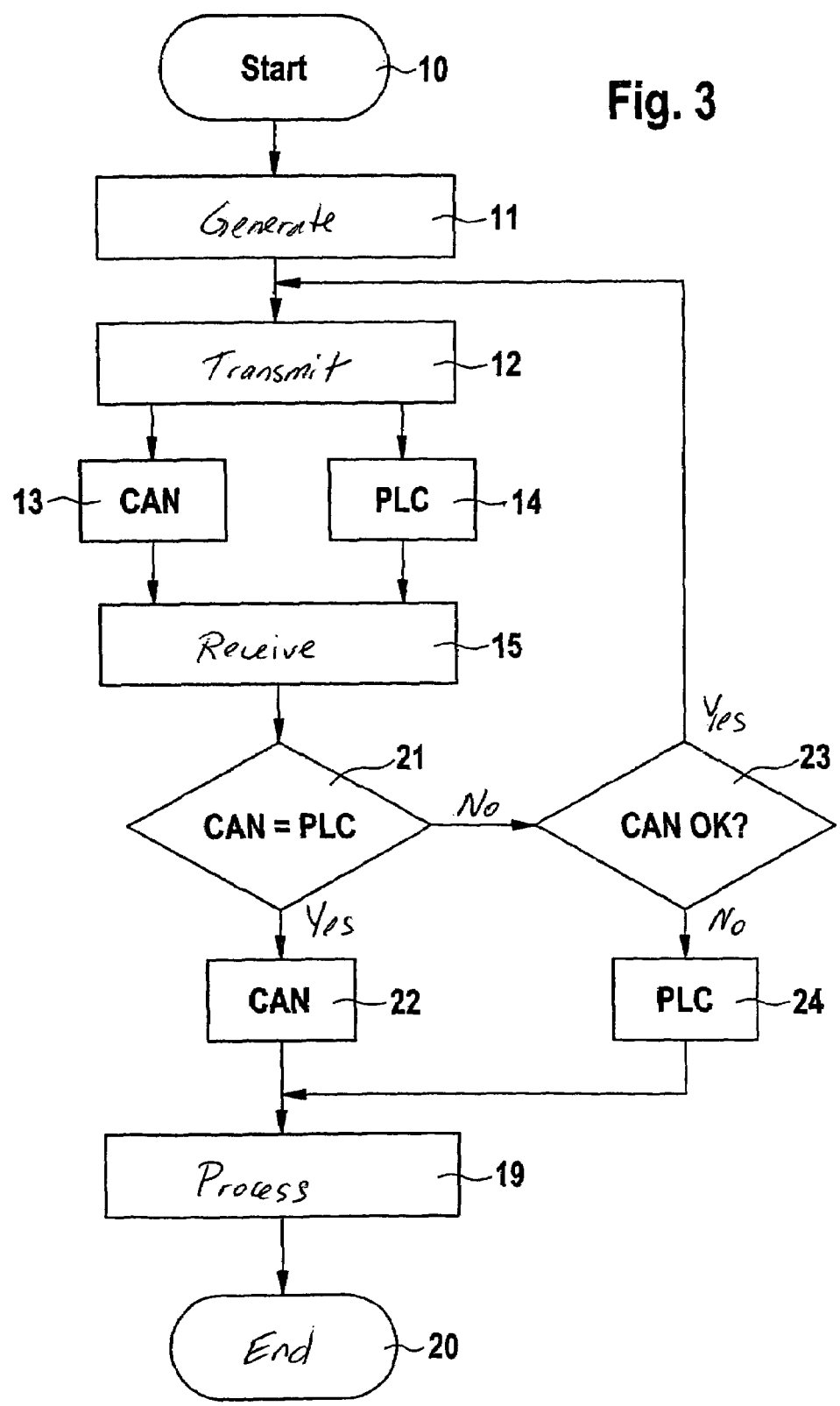
FIG. 3 shows a second exemplary embodiment of a method according to the present invention.

FIG. 3 shows another exemplary embodiment of an exemplary method according to the present invention, in which, as in the exemplary embodiment of FIG. 2, the information generated is transmitted over both data bus CAN and supply line structure PL and received by receiving component 2, 3, 4. In a query block 21 it is checked whether the information transmitted over data bus CAN is identical to the information transmitted over supply line structure PL. According to this exemplary embodiment, supply line structure PL for transmitting information is used for a plausibility check. If the information transmitted over data bus CAN is identical to the information transmitted over supply line structure PL, it may be assumed that the information has been transmitted without error. In a function block 22, the information transmitted over data bus CAN is used for further processing in receiving electrical component 2, 3, 4. Otherwise, the exemplary method branches off to a query block 23, in which it is checked whether data bus CAN is functioning properly. If so, the exemplary method branches off to function block 12, where the information generated is retransmitted. Otherwise, the exemplary method branches off to a function block 24, where the information transmitted over supply line structure PL is used for further processing. Subsequently the exemplary method branches off to a function block 19, where the information received is processed. The exemplary method according to the present invention is terminated in a function block 20.

Figure 4:
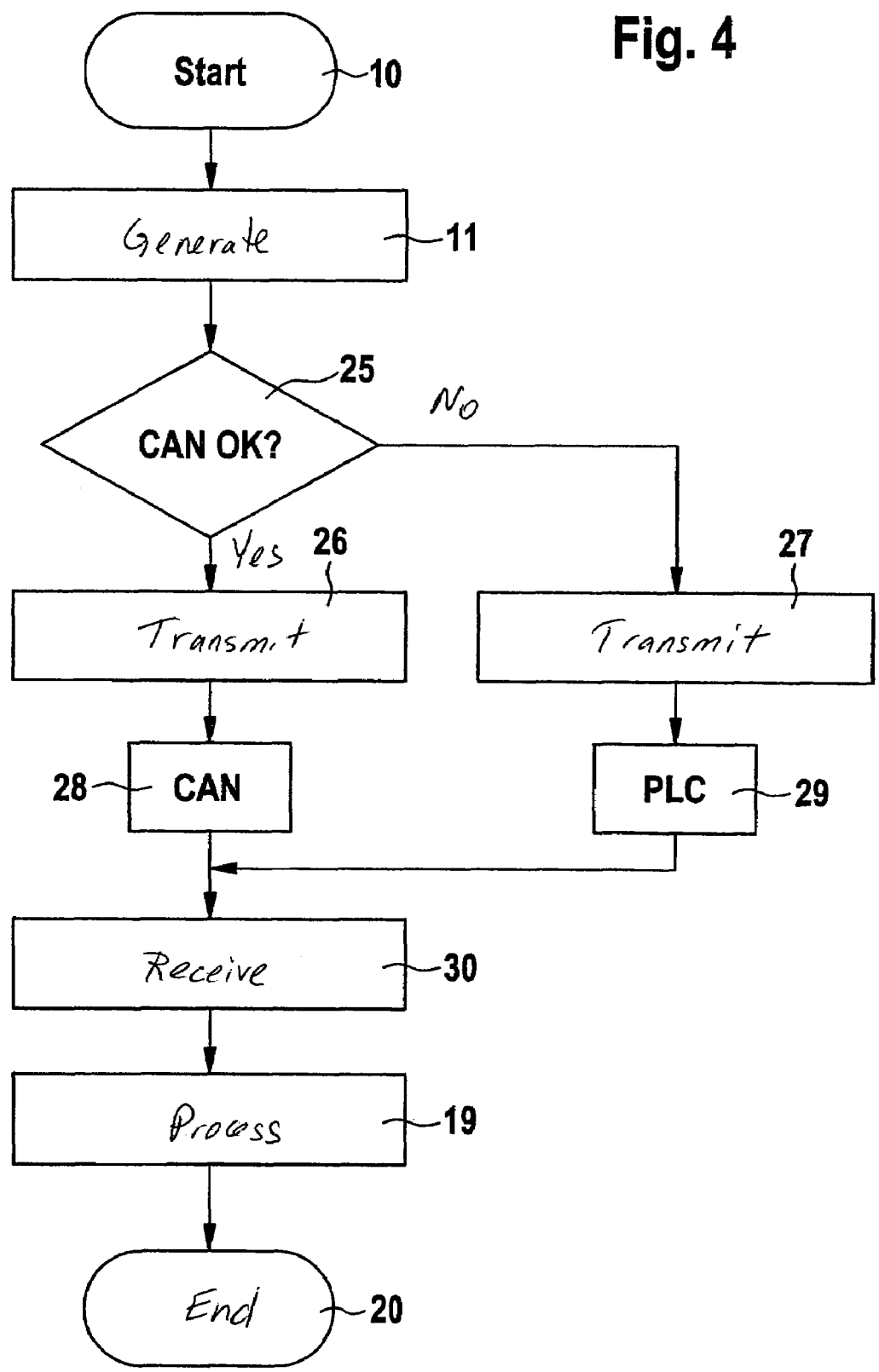
FIG. 4 shows a third exemplary embodiment of a method according to the present invention.

FIG. 4 shows a third exemplary embodiment of an exemplary method according to the present invention. In this exemplary embodiment it is checked in a query block 25, even before the generated information is transmitted, if data bus CAN is functioning properly. If so, in a function block 26 the information generated is transmitted over data bus CAN (function block 28). Otherwise, in a function block 27 the information generated is transmitted over supply line structure PL (function block 29). The information transmitted either over data bus CAN or over supply line structure PL is received in a function block 30.

In this exemplary embodiment, the information is normally transmitted over data bus CAN. During this time, supply line structure PL may perform other communication functions and transmit other information. If needed, supply line structure PL may transmit at least part of the information previously transmitted over data bus CAN and prevent the failure of receiving component 2, 3, 4 or even the entire motor vehicle. If supply line structure PL takes over information transmission, transmission of other information running on supply line structure PL may either be interrupted or it may also be continued if the bandwidth of supply line structure PL is adequate.

What is claimed is:

1. A method for transmitting information between electrical components in a motor vehicle, comprising:
   transmitting a first information over a data bus and transmitting other different information over a supply line structure if information transmission over the data bus is functioning properly, wherein the data bus is a standardized bus system configured for solely transmitting information between the electrical components and is not a supply line structure; and
   powering at least some of the components via the supply line structure that is separate from the data bus;
   wherein, if a failure of the data bus occurs, the first information is transmitted over the supply line structure, and the transmitting of the other different information is one of a) interrupted, or b) continued only if data transmission capacity of the supply line structure is sufficient to handle the transmitting of the other different information.

* * * * *